United States Patent [19]
Shaw

[11] Patent Number: 5,278,894
[45] Date of Patent: Jan. 11, 1994

[54] USE OF INCOMING CALLER LINE IDENTIFICATION

[75] Inventor: I-Nuoh R. Shaw, Naperville, Ill.

[73] Assignee: AT&T Bell Laboratories, Murray Hill, N.J.

[21] Appl. No.: 783,052

[22] Filed: Oct. 25, 1991

[51] Int. Cl.$^5$ .................... H04M 1/57; H04M 1/64; H04M 7/06
[52] U.S. Cl. .................................. 379/67; 379/88; 379/142; 379/230
[58] Field of Search ............... 379/67, 88, 142, 245, 379/246, 201, 230, 247

[56] References Cited

U.S. PATENT DOCUMENTS

| | | | |
|---|---|---|---|
| 4,811,382 | 3/1989 | Sleevi | 379/67 |
| 4,894,861 | 1/1990 | Fujioka | 379/374 |
| 4,985,913 | 1/1991 | Shalom et al. | 379/76 |
| 4,996,704 | 2/1991 | Brunson | 379/67 |
| 5,023,868 | 6/1991 | Davidson et al. | 370/62 |
| 5,121,423 | 6/1992 | Morihiro et al. | 379/142 |

OTHER PUBLICATIONS

"LASS: Putting the Telephone Customer in Charge", AT&T Bell Labs. Record, May 1985, pp. 10-17, C. B. Hirschiman; et al.

"Intelligent Network/2: A Flexible Framwork for Exchange Services", P. Miller, Bell Communications Research Exchange, vol. 3, Issue 3, May/Jun. 1987, pp. 9-13.

"Class and Beyond-Revolution n Residential Services",
H. Lilleniit et al., Telesis 1988 Three (Canada), pp. 49-54.

"ANI is the Key to Unlock Advanced Networks Services", K. G. Hegebarth, Telephony, Nov. 14, 1988, pp. 64, 66, 68.

"5ESS(R) Switch Feature Handbook", AT&T Manufacturer's Manual 235-390-500, Issue 6, Dec. 1990, pp. 139-146.

"Quick Guide to Audix", AT&T Manufacturer's Brochure 585-302-702, Issue 2, pp. 1-6.

Anonymous, "Lass Selective Messages Feature Selective Response Messages for Telephone Answering systems", International Technology Disclosures, vol. 9, No. 6, Jun. 25, 1991, p. 3.

Primary Examiner—Thomas W. Brown
Attorney, Agent, or Firm—Werner Ulrich

[57] ABSTRACT

This invention relates to a method and apparatus for providing customized greeting messages from a switch-based voice messaging service. Advantageously, special messages may be left for identified callers. The invention further relates to a method and apparatus for determining which of a plurality of numbers received in a common channel signaling message is to be used as the ICLID number for a specific call. The candidate ICLID numbers include the caller station telephone number, the caller's calling card number, or a special number provided by the caller. Advantageously, such an arrangement can be used to identify callers who are calling away from their home or business telephones.

6 Claims, 2 Drawing Sheets

USE OF INCOMING CALLER LINE IDENTIFICATION

CROSS-REFERENCE TO RELATED APPLICATION

This application relates to an application by I-Nuoh Rose Shaw entitled "Calling Line Identification," Ser. No. 782,703, concurrently filed herewith and assigned to the same assignee as this application.

TECHNICAL FIELD

This invention relates to arrangements for processing incoming telecommunications calls whose caller is identified.

PROBLEM

Incoming caller line identification (ICLID) is becoming increasingly prevalent in the United States. With ICLID, the called customer is informed, usually through a display, of the identity of the calling customer by being informed of the telephone number (and in some private branch exchanges, also the name) of the caller. This arrangement not only informs the called customer as to who is calling, but is the basis of a number of local area signaling services (LASS): selective call forwarding wherein only calls from predetermined numbers are forwarded to another number; selective call acceptance wherein only calls from a predetermined list of callers are completed to people or computer systems, selective call rejection wherein all calls are completed except those from a predetermined list of callers; and selective distinguished alerting wherein calls from a predetermined list of callers are specially alerted with a distinctive ringing signal. A problem of the prior art is that while ICLID permits selective calls acceptance, forwarding, rejection, and special alerting, it does not offer the facility for selective treatment on automatic call messaging. A further problem is that the ICLID number most appropriate for providing LASS features may not be the caller's telephone directory number as identified by Automatic Number Identification.

SOLUTION

The first problem is solved and an advance is made over the prior art in accordance with the principles of this invention wherein a called customer is provided with call messaging service (such as the audio information exchange (AUDIX ™ service offered in 5ESS ® switches manufactured by AT&T) and, in a departure from the prior art, providing in that messaging system for a plurality of greeting messages and for an arrangement for selecting among these greeting messages based upon the ICLID of a caller. Advantageously, such an arrangement provides the facility for allowing personalized messages to be used for individual incoming callers, which private messages are kept from other callers.

Further, in accordance with the principles of this invention, the second problem is solved in the telecommunications switch serving the called customer by determining from among the numbers received in common channel signaling messages from a switch serving the caller, that number which has been indicated in the messages as being the most appropriate number for ICLID use. This number is then used for selecting the personalized messages and for providing the LASS features to the called customer.

In accordance with one specific embodiment of the invention, if a call is received and steered to the messaging system because the called customer is busy or does not answer, then the message to be played back to the caller is selected from among a plurality of such messages according to the value of the determined received ICLID number. This received ICLID number is compared with a list of numbers, each number associated with a greeting message, and if there is a match, selects the corresponding greeting message. If there is no match, the default message, which may either be personal or provided by the system, is selected instead.

DETAILED DESCRIPTION

Figure 1:
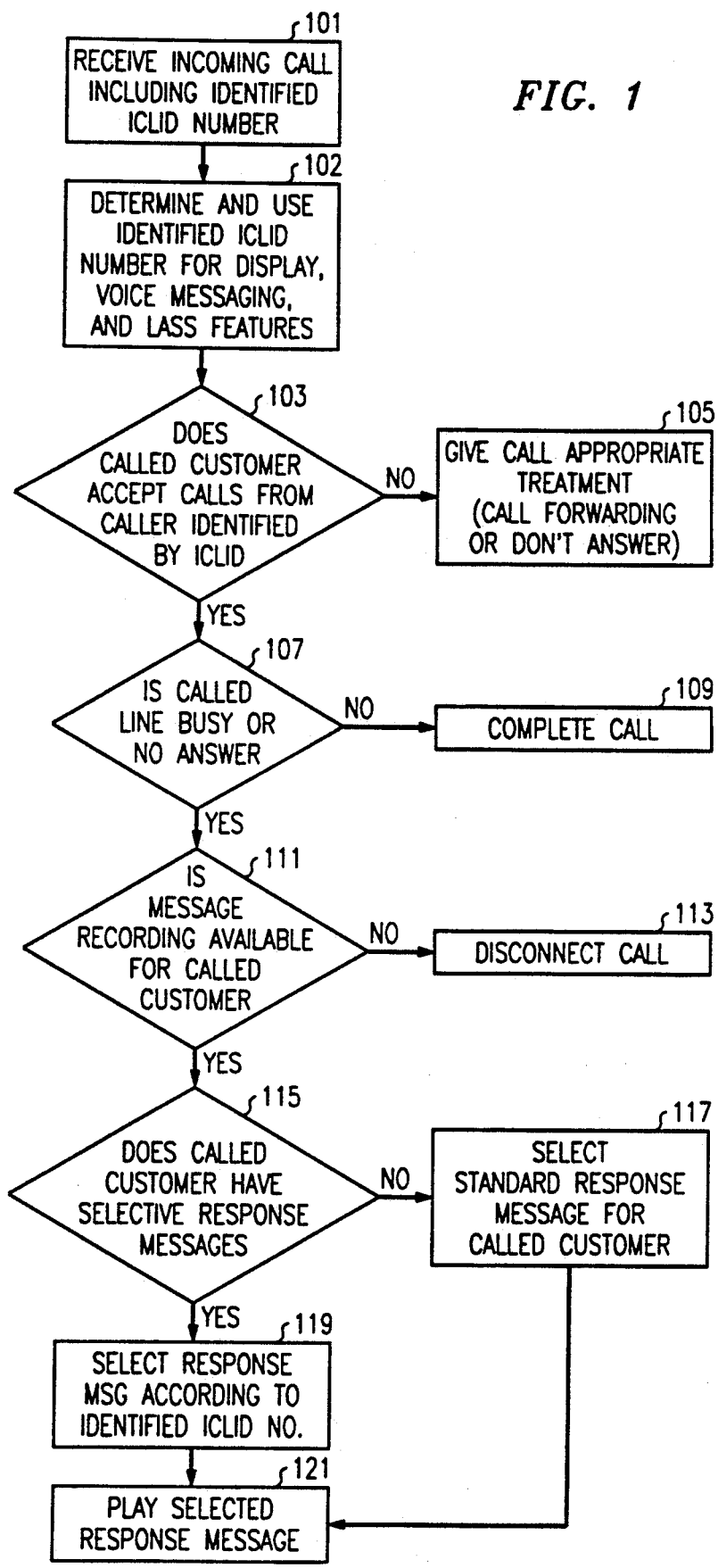
FIG. 1 is a flow diagram of a method for providing alternate greeting messages to a caller, based on an ICLID number.

FIG. 1 is flowchart of an illustrative embodiment of the invention. An incoming call is received, which call includes an incoming calling line identifier (ICLID) number (action block 101). In accordance with the teachings of the related application, this number is identified among a plurality of possible numbers as the ICLID number in a common channel signaling message containing ICLID number identification data from a switching system serving the calling customer. The terminating switch determines which of these numbers is to be used as the ICLID number by examining the identification data. The number is then used as the ICLID number for that call for display at the called telephone, and voice messaging and LASS features (action block 102). Test 103 determines whether the called customer accepts calls from the caller identified by the determined ICLID number. If not, the call is given appropriate treatment such as call forwarding or don't answer (action block 105). If the called customer receives calls from this ICLID number, then test 107 determines if the called customer's telephone is busy or does not answer. If the called customer answers the telephone, the call is completed (action block 109). If the called line is busy or does not answer, then test 111 determines whether message recording is available for that called customer. If not, the call is disconnected (action block 113). If message recording is available to that called customer, test 115 determines whether the called customer has a selective response message service. If not, then the standard response message for the called customer is selected (action block 117). If the called customer does have selective response message service, then the appropriate response message is selected according to the ICLID number (action block 119). For each number on a list of ICLID numbers having special greeting messages, there is a message ID attached which represents the response message to be used. If a match is found between the received ICLID number for the call and a number on that list, then that particular response message is selected. Otherwise, if there is no match with any of the ICLID numbers of that list for the called customer, then the standard response message for that called customer is selected. The response message selected in block 117 or 119 is then played back to the caller (action block 121). For some ICLID numbers, it may be desirable that no response message be returned as one of the response message options, and/or, that no incoming message will be recorded.

In accordance with this specific implementation, the user uses an AUDIX voice messaging system to prepare the special greetings in response to additional AUDIX prompts for preparing these greetings. The user then enters the LASS feature environment to associate the message identifications, supplied by the user in response to LASS prompts, with numbers on the selective number list for LASS, in a LASS list editing session. AUDIX prompting arrangements and LASS editing sessions are described in manufacturer's brochures supplied by AT&T. Advantageously, the special capabilities of the AUDIX system prompting features and the LASS list editing features can be used in a coordinated fashion to implement this invention, as described below.

A user of the voice messaging system prepares the special greeting in response to a prompt. The user keys in digits representative of the type of action to be performed and, in response to subsequent prompts, enters the message ID. Then the user gives this message ID to the number on a LASS selective message list in a LASS editing session. The system also prompts the user to enter a command for deleting a specific greeting. When the specific greeting is deleted, the ICLID numbers for which this greeting is to be applied is also updated to use any other message or is also deleted. Special greetings could be deleted either by specifying one of the message ID numbers for the special greeting or by letting the user listen to the repertory of special greetings one by one and select the particular greeting(s) to be deleted.

Figure 2:
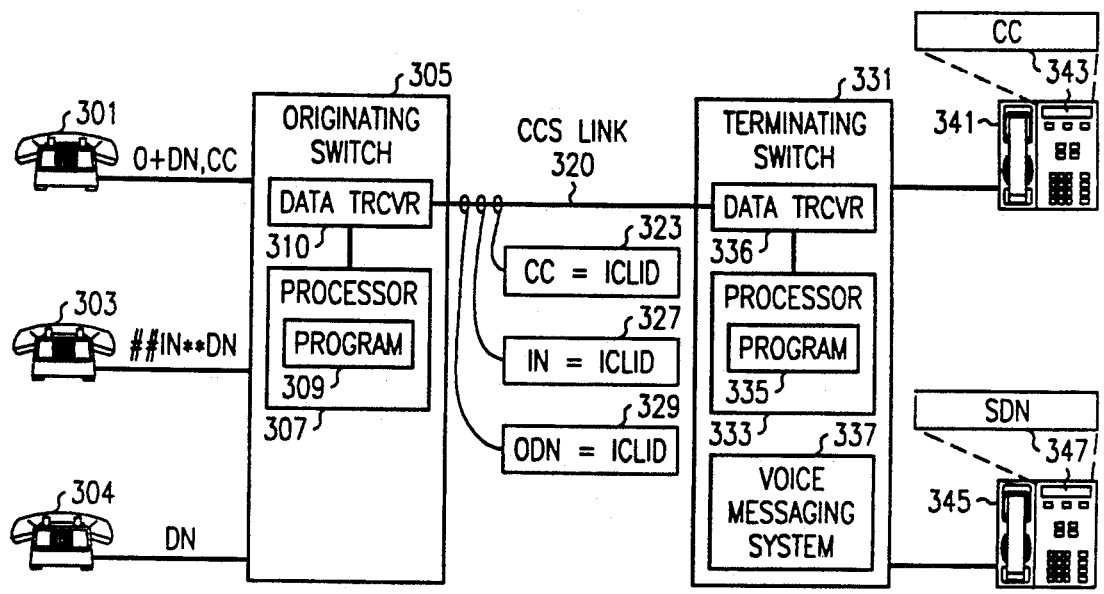
FIG. 2 is a block diagram of apparatus for implementing applicant's invention.

FIG. 2 is a block diagram to illustrate the invention. Two telephones, stations 301 and 303, are connected to an originating switch 305. The originating switch comprises a processor 307 operating under the control of a program 309. Originating switch 305 is connected via a common channel signaling link 320 (which may traverse one or more signal transfer points, not shown) to a terminating switch 331. The terminating switch 331 comprises a processor 333 controlled by a program 335. The terminating switch is connected to two telephone instruments 341 comprising an ICLID display 343 and 345 comprising an ICLID display 347. If telephone station 301 dials 0 plus a directory number and a calling card number, and indicates preference for the calling card number, then the originating switch 305, using a data transceiver 310, will transmit a common channel signaling message (CCS) 323, which comprises an indicator that the calling card is the ICLID number, over data link 320. The calling card number is then transmitted to the terminating telephone station 341. Similarly, telephone station 303 dials a number comprising an initial ##, an identification number (IN), a delimiter**, and a directory number. In this case, the originating switch 305 under the control of processor 307 and program 309, transmits a CCS message 327 indicating that the IN is the ICLID number. The CCS message is received in data transceiver 336 of terminating switch 331. This number would then be forwarded to terminating station 345 for display. Terminating switch 331 also comprises a voice messaging system for recording incoming voice messages and for providing greeting messages including specialized greeting messages to callers.

Telephone instrument 304 simply dials a directory number and the default CCS message which indicates the originating station directory number (ODN) 304 as the number to be displayed at the terminating customer's telephone. This is shown in CCS message 329 which indicates that the ODN is to be used as the ICLID number.

While in this specific embodiment, it is assumed that the ICLID number, i.e., the number which would be displayed at the called customer's telephone station or, unless privacy restrictions apply, is the same number that is used for LASS selective features and for controlling the voice messaging system as described above, and while this is the most convenient arrangement with the present signaling format in which the ICLID number is specifically identified, this need not be the case in future implementations in which an LASS number (i.e., a number to be used for LASS selective features) and an ICLID number (a number to be displayed to the called customer) can be two separate quantities each suitably identified directly or by default.

As indicated above, the ICLID number need not be the calling customer's telephone number but can be an identification number or a calling card number. If the caller dials an identification number, properly identified, for example, by a preliminary ## and a terminal **, or gives an indication, in response to a prompt, that a calling card number which has been supplied for a call should be used instead of the calling station directory number and uses this alternate number instead of the calling station directory number for the purpose of searching the lists associated with LASS features and greeting message choice. The advantage of such an arrangement is that if a caller calls from public station that caller can still access special greeting messages or LASS features use intended for that caller even though the calling telephone number is not recognized.

The identification number may consist of a personal identification number plus a special directory number. If the personal identification number matches a number stored in switch 331, then the special directory number is used as the ICLID number for display, for LASS features and for accessing the special greeting message.

Currently the CCS messages between the originating switch and the terminating switch contain a plurality of numbers including both the calling telephone number and calling card number. In order to implement this invention, only a one-byte space in the CCS message needs to be allocated to accommodate the acquired indication data identifying which number is to be used for caller identification. In the preferred embodiment, if the caller keys an identification number, that number should be transmitted in a presently unused field of the Initial Address Message (IAM) transmitted to the terminating switch.

It is to be understood that the above description is only of one preferred embodiment of the invention. Numerous other arrangements may be devised by one skilled in the art without departing from the scope of the invention. The invention is thus limited only as defined in the accompanying claims.

I claim:

1. A method of processing a call comprising the steps of:

receiving, in a terminating switching system, a common channel signaling message, said message comprising a plurality of numbers and indication data of which of said plurality of said numbers is to be used as an Incoming Caller Line Identification (ICLID) number for a said call; and using the number determined from said indication data as an ICLID number for processing said call in said terminating switching system.

2. The method of claim 1 wherein said using step comprises transmitting said number for display to a called telephone.

3. The method of claim 1 wherein said using step comprises using said ICLID number as an ICLID number for Local Area Signaling Services (LASS) features for a called customer of said call.

4. The method of claim 1 wherein said using step comprises:
   responsive to determining that message service is to be provided for said call, comparing said ICLID number with stored ICLID numbers corresponding to a special greeting message; and
   if said received ICLID number matches one of said stored numbers, returning on said call a greeting message corresponding to said matched stored number.

5. The method of claim 1 wherein said receiving comprises receiving common channel signaling (CCS) messages comprising said numbers and said indication data.

6. Apparatus for processing a telephone call comprising:
   means for receiving a common channel signaling message; and
   processor means operative under the control of a program for processing messages for said call, said messages comprising a plurality of numbers and indication data of which of said numbers is to be used as an ICLID number for said call for determining the ICLID number for said call; and for using the determined ICLID number for processing said call in response to previously stored indications from a called customer of said call of how calls from said determined ICLID number are to be processed.

* * * * *